No. 663,232. Patented Dec. 4, 1900.
W. KINGSLAND.
SWITCH BOX FOR ELECTRIC RAILWAYS.
(Application filed July 5, 1900.)
(No Model.) 2 Sheets—Sheet 2.
FIG: 2.
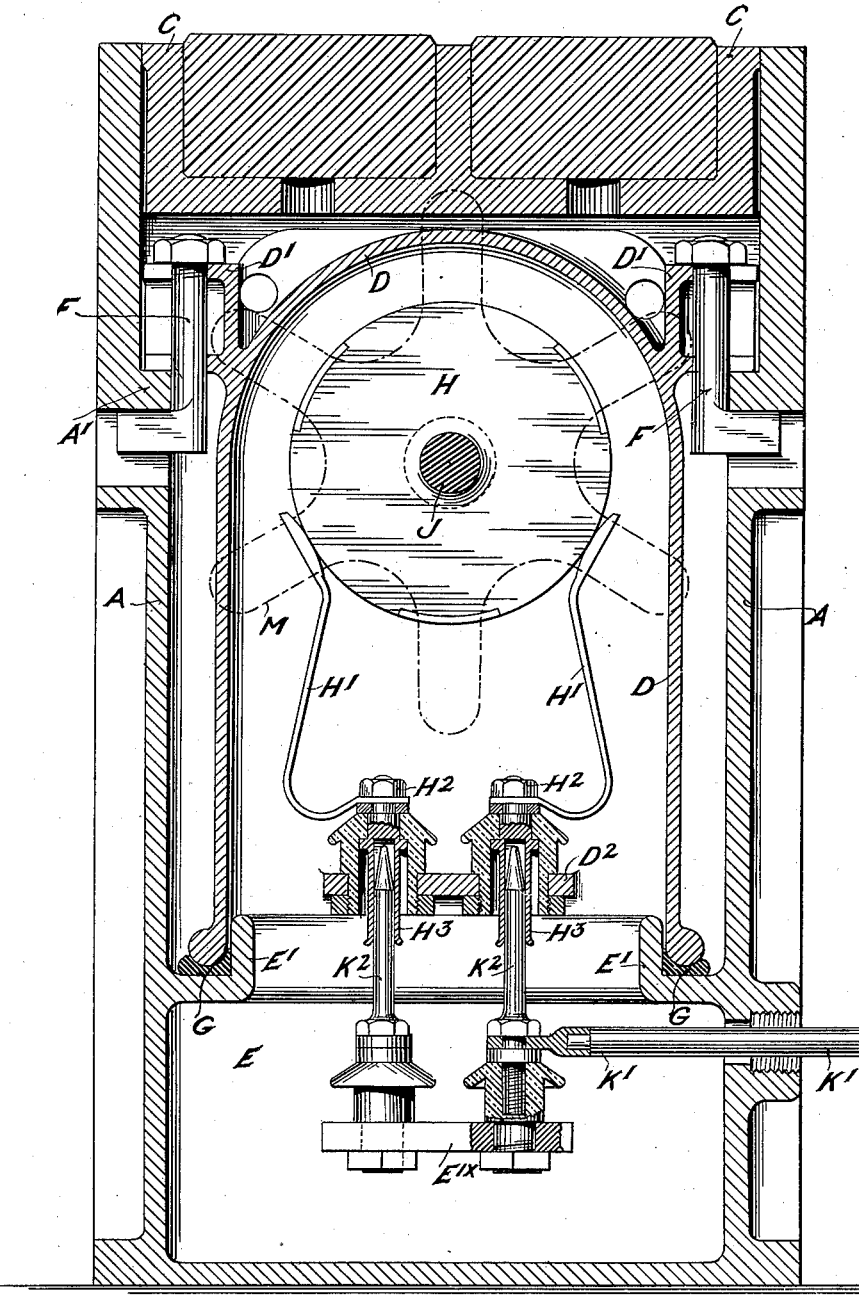

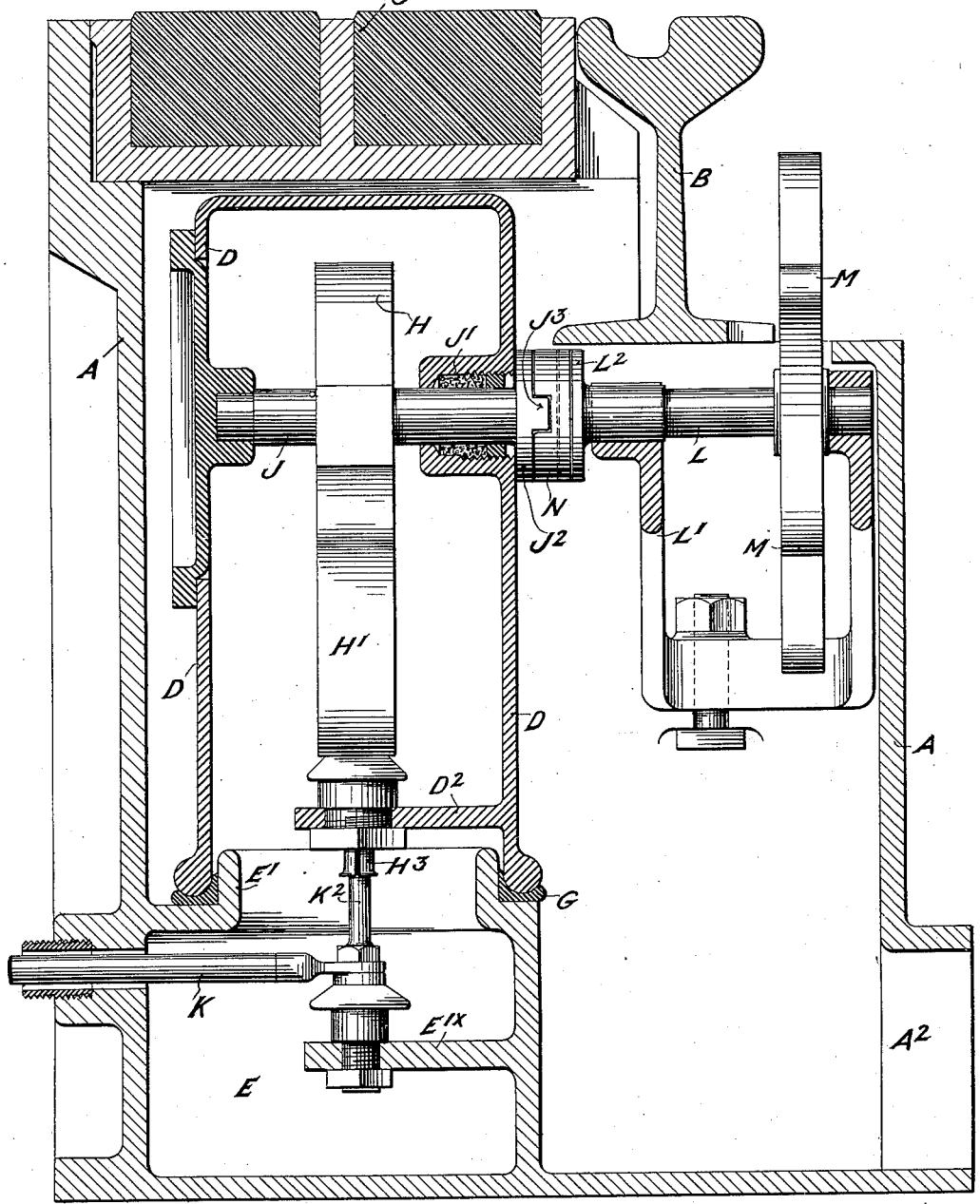

UNITED STATES PATENT OFFICE.

WILLIAM KINGSLAND, OF LONDON, ENGLAND.

SWITCH-BOX FOR ELECTRIC RAILWAYS.

SPECIFICATION forming part of Letters Patent No. 663,232, dated December 4, 1900.

Application filed July 5, 1900. Serial No. 22,534. (No model.)

*To all whom it may concern:*

Be it known that I, WILLIAM KINGSLAND, electrical engineer, of 8 Breams Buildings, Chancery Lane, in the city of London, England, have invented certain new and useful Boxes for Containing Switches and Actuating Mechanism for Use in Electrical Traction, (for which I have made application for a patent in Great Britain under date of December 13, 1899, No. 24,791,) of which the following is a specification.

This invention refers to the combination and arrangement of parts hereinafter described and claimed for use in conjunction with a rail-track and composing an improved box for containing a mechanically-operated electrical switch and the mechanism connected with the switch by which the latter is operated, the ends in view being to provide an inner switch-containing case which, together with the switch therein, can readily be withdrawn from the outer box without dismounting the mechanical apparatus in the said outer box and without it being required to disconnect the electrical connection of the switch prior to the removal of the inner case, to provide means whereby the switch-case can be effectually rendered water-tight when in position in the said outer box and whereby the electrical connections are made by the replacement of the said inner case, to provide means whereby the switch-operating shaft (which projects through the wall of the inner case) can readily be alined and connected with the shaft of the exterior operating mechanism (which is within the outer box) or any slight deviation from the true alinement of the two connected shafts is automatically allowed for, and to provide means whereby the said mechanical apparatus in the said outer box can be readily inspected and removed.

I will describe my invention with reference to the accompanying drawings, wherein—

Figure 1 is a transverse section of my improved switch-containing box, and Fig. 2 is a longitudinal section of same.

The outer box A, which may be formed of cast-iron, is arranged adjacent to the rail-track, so that a striker-bar carried by the vehicle can operate the switch-actuating mechanism. Part of this box A may pass under rails, which may form a slot, one of such rails being shown marked B, while the other part of the box is outside the rails and is provided with a cover C on a level with the rail-head or roadway. Inside this box A, I place an interior casing D, which contains the electrical switch part of the apparatus. The interior casing D is open only at its base, and when the case D is in position within the box A its lower edges rest upon packing carried by the sides which form a compartment E within the lower part of the box A, the compartment being open at the top, with a flange E' around same to support india-rubber or other packing G and to form a guide for the lower edges of the case D. As will be well understood, instead of employing the india-rubber packing G the flange E' of the compartment E may be made of trough formation and contain a liquid seal, such as mercury, into which the lower edges of the case D will enter. The case D is formed or provided with bracket-pieces D', which are located above projecting lugs A' on the box, and bolts F connect the brackets D' and the lugs A' and form means whereby the case D is held onto the base-compartment E and whereby the said case D can be adjusted upon its packing G. Thus when placed in the position shown the interior of the case D is water-tight and the said case is readily accessible and removable through the cover C of the box A.

The electrical switch, which may be of any approved construction, is fitted within the interior case D, the particular switch I have shown (marked H) being of cylindrical form and operating in conjunction with two brushes H' H'. One end of the spindle J, which carries the switch, is mounted in a bearing formed in the interior of one side of the casing D, while the other end of the spindle J projects through the other side of the casing by a packed gland, such as J'. The end of the spindle J on the exterior of the case D is coupled to the mechanism by which the switch is operated, as will be hereinafter described.

The electrical conductors or mains, such as K K', pass from the outside through into the compartment E, which is closed by the case D, and the apertures by which the conductors enter are closed water-tight by packing or other suitable means. These conductors terminate in upstanding parts or pillars K² K², which are carried on insulators by a bracket E'ˣ, formed in the interior of the compartment E. The terminals H² H² of the switch are carried on insulators by a bracket D², formed within the case D, and have downwardly-projecting spring-clips—such, for example, as split tubes H³ H³—which are adapted to fit and grip closely upon the pins K² K². By this arrangement the electrical connections are disconnected and remade by the act of removing and replacing the case D, the tubular parts H³ H³ sliding off and on the pins K².

The operating mechanism for the switch is contained in the box A and consists of a revoluble spindle L, which is carried by bearings formed in a removable bracket L', fixed by bolts to the walls of the box A. The spindle L, which is to be operated by tappet action, carries a lever or a tappet-wheel having several arms—such, for example, as that shown at Fig. 1 marked M and indicated by dotted lines at Fig. 2—the spindle L being operated through the tappet arm or wheel M by the action of the striker carried upon the car. The arrangement of this operating mechanism, together with the arrangement of the removable case D, as described, presents advantages in that after the removal of the said case D from the box A, I am enabled to readily remove the spindle L and the parts connected therewith from the outer box A. It is of considerable importance in practice that the switch and the operating mechanism should be most accessible for removal and repairs, and by the arrangement described it will be seen that this end is attained according to my invention in a most effective and ready manner, the removal of the switch-case D leaving convenient space for disconnection and removal of the operating mechanism. The end of the spindle L is to be connected to the end of the spindle J, and these spindles are first brought into alinement as nearly as possible by the adjustment of the case D; but in order to allow for any slight deviation in such alinement I couple the ends of the spindles L and J by means of a suitable form of universal joint. A form of joint suitable for this purpose is constructed as follows: The end of the switch-spindle is provided with a disk J², having a projecting rib J³ upon its outer face, there being a similar disk L² and rib (shown by dotted lines) upon the end of the spindle L. Between the faces of these disks J² L², I fit an intermediate disk N, having a groove on one face to receive the rib J³ upon the switch-spindle end and a groove at right angles to the first groove in the other face of the intermediate disk N to receive the rib upon the disk L² of the operating-spindle L, and by this connection any slight variation in alinement will not affect the coworking of the two spindles K and L, while at the same time the said coupling is readily detachable.

The box A is formed at A² with a drainage-aperture, which may be connected to drainage-pipes to carry away the surface water entering the box A.

What I claim, and desire to secure by Letters Patent, is—

1. In a switch-box for electric traction, to inclose an electric switch worked by mechanical means; the combination of an outer box, a removable cover to same, mechanism in the box to mechanically operate a switch, a removable case to be placed inside the box through the cover-aperture thereof, a switch contained within the case, and an operating-spindle therefor projecting through a water-tight bearing in the side of the removable case, means for rendering the case water-tight, means for permitting of the placing and removal of the case to or from the box together with the contained switch without dismounting the mechanism located in the outer box, and means for detachably connecting the projecting end of the switch-shaft to the mechanism contained in the outer box for mechanically operating same, as set forth.

2. In a switch-box for electric traction, to inclose an electric switch worked by mechanical means; the combination with an outer box, a spindle mounted in the box, a mechanically-operated lever on the spindle, a removable cover to the top of the box, and a seating in the interior of the box; of an inner removable case adapted to be placed within the box, and held to the seating therein so as to be rendered water-tight, a switch contained within the case, the operating-spindle thereof passing through the side of the said case, means for detachably connecting the said end of the switch-spindle to the mechanically-operated spindle within the box, and means for connecting the electric terminals of the switch located within the switch-case to the electric connections within the box, as set forth.

3. In a switch-box for electric traction to inclose an electric switch worked by mechanical means; the combination with an outer box, mechanism therein to mechanically operate a switch-shaft, a removable cover to the box and a seating within the box, of a case formed with an open base and containing an electric switch, a switch-spindle for operating same projecting through a water-tight bearing in the side of the case, the said case being placed within the box, and means for holding the lower edges of the open base of the case upon the seating in the box to render the case water-tight, means for detachably connecting the switch-spindle to the operating mechanism within the outer box, and means for detachably connecting the electric terminals of the switch within the switch-case to electric connections covered by the switch-case, substantially as set forth.

4. In a switch-box for electric traction, to inclose an electric switch worked by mechanical means; the combination with an outer box, a removable cover to the box, a spindle carried on bearings within the box and mechanical means for operating the spindle, a removable case to be placed inside the box, a switch contained within the case, an operating-spindle from the switch extending through the said case, means for effecting the electrical connection of the switch and conductor-terminals upon the insertion of the switch-case within the box, and means for rendering the said switch-case water-tight when fixed in position within the box; of means for adjusting and securing the switch-case within the box to bring the axes of the switch-spindle and the operating-spindle as nearly coincident as possible, and a detachable coupling of universal-joint character between the ends of the switch-spindle and the operating-spindle, substantially as set forth.

5. In a switch-box for electric traction to inclose an electric switch worked by mechanical means; the combination with an outer box, a removable cover to the box, and mechanism in the box to mechanically operate a switch-spindle, a case to be placed inside the box through the cover-aperture thereof, a switch contained within the case, a spindle projecting through the case for operating the switch, and a detachable connection between the projecting switch-spindle and the operating mechanism in the outer box; of an opening in the base of the switch-case, means for making a water-tight joint between the edges of the said opening and a seating in the box, switch-terminals with downwardly-extending spring-sockets carried within the open base of the switch-case, and electric connections in the box terminating in upstanding parts adapted to enter the spring-sockets forming switch-terminals, carried by the switch-case when the latter is placed in position, and thereby effect electrical connection, substantially as set forth.

6. In a switch-box for electric traction, to inclose an electric switch worked by mechanical means; the combination with an outer box, a removable cover to the box, and a mechanically-operated shaft in the box to work a switch-spindle, a case to be placed inside the box through the aperture, a switch contained within the case, a spindle from the switch projecting through the case, an opening in the base of the switch-case, means for making a water-tight joint between the edges of the said opening of the case and a seating in the outer box, and electrical connections to the switch; of a universal-joint connection between the ends of the mechanically-operated shaft in the outer box and the projecting end of the switch-spindle, consisting of a disk on the end of the switch-spindle, a projecting rib on the face of the disk, a similar disk and rib on the end of the operating-shaft, and an intermediate loose disk, located between the two ribbed disks aforesaid, and having a groove upon each face, the said grooves extending at right angles to each other, and receiving the ribs of the disks, whereby rotary motion can be communicated from the shaft to the switch-spindle, even when not perfectly alined, and the coupling can be connected and detached by the act of inserting or withdrawing the inner case, as set forth.

7. In a switch-box for electric traction to inclose an electric switch worked by mechanical means; the combination with an outer box, a removable cover to the box, a case to be placed in the interior of the box, a switch contained within the case, a spindle projecting through the case for operating the switch, and means for rendering the case water-tight when inserted in the outer box; of mechanism within the box, arranged at the side of the case, to mechanically operate the switch-spindle, a detachable connection between the projecting switch-spindle and the operating mechanism in the outer box, the said operating mechanism being capable of ready removal from the outer box after the removal of the switch-case as set forth.

WILLIAM KINGSLAND.

Witnesses:
GRIFFITH BREWER,
THOMAS W. ROGERS.